3,326,811
PROCESSING OF IRRADIATED NUCLEAR FUELS

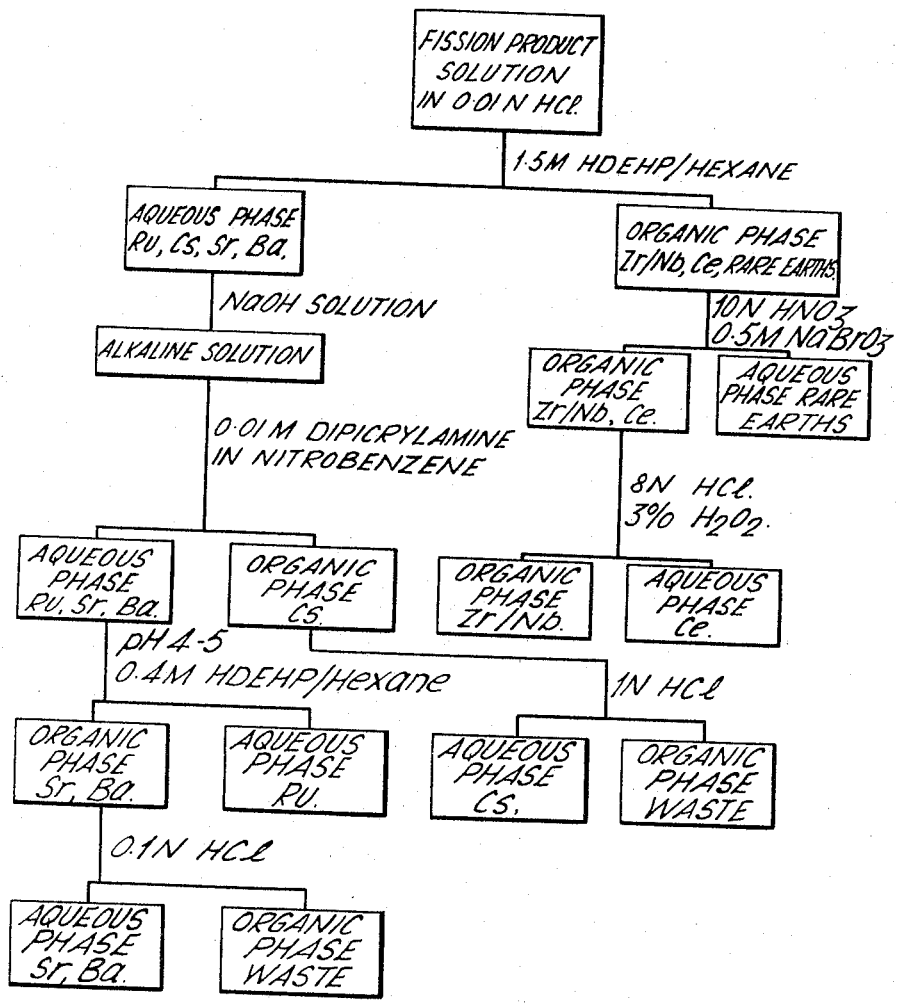

Thomas Victor Healy, Abingdon, England, assignor to United Kingdom Atomic Energy Authority, London, England
Filed June 30, 1964, Ser. No. 379,318
Claims priority, application Great Britain, July 12, 1963, 27,747/63
17 Claims. (Cl. 252—301.1)

The present invention relates to a method for the separation of fission products and is particularly concerned with a solvent extraction method for such separation.

According to the present invention there is provided a process for the treatment of an aqueous acidic solution containing compounds of fission product metals, such process comprising the steps of treating the said solution with an organic solution containing di(2-ethyl hexyl) phosphoric acid, to give an organic phase and an aqueous phase and washing such organic phase with at least one aqueous solution of mineral acid.

The di(2-ethyl hexyl) phosphoric acid (HDEHP) may be dissolved in any suitable solvent and the hydrocarbons are to be preferred. To avoid radiation damage to the solvent however, it is preferred not to use unsaturated hydrocarbons and thus the use of saturated aliphatic or aromatic hydrocarbons is desirable.

In the preferred arrangement, separation of the fission products into four small groups is effected by separate treatment of the organic solution with aqueous solutions containing 7–11 N nitric and 4–10 N hydrochloric acid in turn, the group separated comprising: (1) ruthenium, caesium, rubidium, barium and strontium, (2) rare earth metals less cerium, (3) cerium, and (4) zirconium and niobium. In such a separation, the original aqueous fission product solution would be 0.005–0.1 N with respect to hydrochloric acid. It is possible to achieve much less than 1% (usually <0.01%) contamination of a group by a metal in another group, thus more than 99.8% of the cerium is obtained in the third grouping which contains less than 0.1% of any other fission product. It should be appreciated that the first group comprises those metals which are not extracted into the organic phase.

The aqueous phase containing the first group of metals may be treated to effect further separation of the metals. Caesium may be extracted from an alkaline solution (pH 10–13) using an extractant solution of 0.005–0.5 M dipicrylamine in nitrobenzene which is subsequently scrubbed with 0.1–5 N aqueous hydrochloric acid to recover the caesium. The strontium and barium remaining in the aqueous phase may be separated from the ruthenium by extraction with 0.1–1.0 M HDEHP in hexane from a weakly acid (pH 3–7) aqueous solution. The strontium and barium may be then back-extracted into an aqueous phase using 0.05–2.5 N hydrochloric acid.

If it is not desired to separate the cerium from the rare earth group, the process may be modified so that the rare earths plus cerium are extracted from the organic phase together, this being effected by a single washing with either the hydrochloric acid solution or the nitric acid solution. It will be realised that in separating the rare earths from cerium, it is necessary that an oxidant is present in the nitric acid solution to prevent cerium being extracted with the rare earths. The oxidant serves to keep the cerium in the tetravalent state, and the preferred oxidant is sodium bromate having a concentration 0.1–1.0 M. In washing the aqueous phase with hydrochloric acid to remove the cerium, the effect of the oxidant is reversed by using hydrogen peroxide having a concentration of 1–10% in the hydrochloric acid solution.

Alternatively, an approximate separation of the rare earths may be achieved by separating the rare earths into two sub-groups, the lanthanum group and the yttrium group. This may be effected by a variation in the concentration of the mineral acid wash, for example, by using dilute hydrochloric acid solution of concentration 0.3–1.0 N instead of the nitric acid solution and then the more concentrated hydrochloric acid.

Other variations on the process are also possible. Thus if only zirconium is required to be separated, instead of being a dilute hydrochloric acid solution, the original aqueous fission product solution may be made 1–3 N in nitric acid and 0.5–2.0% in hydrogen peroxide when only the zirconium will be extracted by the (HDEHP) solution from which it may be removed by dilution with toluene and stripping with 3–5 M aqueous hydrofluoric acid.

In addition to showing adaptability, the present invention possesses the advantage that the separation may be rapidly carried out since no carriers are needed and, apart from individual rare earth separation, the whole procedure (including analysis if this is desired) may be carried out in a few hours.

In order that the present invention may more readily be understood, one embodiment of the same will now be described by way of example and with reference to the accompanying drawing which is a flow sheet for the process.

Step 1.—Separation of Ru, Cs, Sr, Ba (and Rb)

The fission products are originally contained in a 0.01 N solution of hydrochloric acid. A suitable quantity of this fission product solution (e.g. 20 mls.) is then contacted with an equal volume (20 mls.) of an organic phase consisting of 1.5 M HDEHP in hexane, agitated for a short time, allowed to settle and then separated. The fission products remaining in the aqueous solution comprise the first group of the separation, i.e. ruthenium, caesium, barium, strontium, and rubidium if the latter is present. The remaining fission products are extracted into the organic phase.

The separated aqueous phase is washed with an equal volume (20 mls.) of hexane which is then added to the organic phase, the diluted organic phase (now 40 mls.) being washed in turn with half its volume (20 mls.) of 0.05 N hydrochloric acid. The wash liquor from the organic phase is then added to the aqueous phase.

The fission products contained in the aqueous phase may be further separated if this is desired. To separate the caesium, the aqueous phase is made alkaline by the addition of sufficient sodium hydroxide to make it 0.1 N with respect to the sodium hydroxide. This alkaline aqueous solution is then contacted with a volume (40 mls.) of an organic phase comprising 0.01 M dipicrylamine in nitro-benzene. The caesium may then be recovered from this organic phase by scrubbing with an equal volume of 1 N hydrochloric acid.

The strontium and barium remaining in the aqueous phase may be separated from the ruthenium by extraction with 0.4 M HDEHP in hexane from a weakly acid (pH 4–5) solution, whereafter the strontium and barium may be recovered from the organic phase by scrubbing out with 0.1 N hydrochloric acid. Separation of the strontium from the barium may be achieved by precipitation methods.

Step 2.—Separation of the rare earths

The organic phase from the first step contains the rare earths, cerium, zirconium and niobium. The rare earths are scrubbed out of this organic 0.75 M HDEHP/hexane solution by contacting with an equal volume (40 mls.) of 10 N nitric acid solution containing 0.5 M sodium bromate, the function of which is to act as a holding oxidant to keep the cerium in its tetravalent state, and thus in the organic phase. This treatment removes more than 99% of the rare earths and leaves more than 99.8% of the cerium in the organic phase.

The aqueous phase is washed with hexane and then partially neutralised with sodium hydroxide to give a dilute acid solution of less than 0.1 N. This dilute solution is then ready for further treatment for separation of the individual rare earths, for example, by using a HDEHP-Corvic column and eluting with perchloric acid. ("Corvic" is a Registered Trade Mark used to describe a poly (vinyl chloride/vinyl acetate) copolymer).

*Step 3.—Separation of cerium*

The organic phase from Step 2 is then washed with 8 N hydrochloric acid solution which contains 3% of hydrogen peroxide. This aqueous solution reduces the cerium to the trivalent state which is then extracted into the aqueous phase in more than 99.7% yield. If cerium is to be extracted with the rare earths, this may be effected using either nitric or hydrochloric acid solutions. The use of hydrogen peroxide will not be necessary since the cerium will be in the trivalent state and thus act as a rare earth.

The zirconium and niobium fission products remain in the organic phase.

It will be appreciated that variations of the above described process are possible and that such variations may be made to suit particular requirements. If the fission product solution contains irradiated thorium, then thorium and protactinium will accompany the zirconium, niobium and cerium (IV). The washing with the acid solution containing hydrogen peroxide to extract cerium (III), will also extract the protactinium and in such a case it is better to modify the process to extract the cerium with the rare earths as hereinbefore described. The protactinium may then be extracted from the organic solution by washing with an aqueous 1-3 N nitric acid solution containing 0.5-2.0% hydrogen peroxide.

I claim:
1. A process for the treatment of an aqueous acidic solution which is at least 0.005 N in mineral acid and which contains fission product metal values comprising the steps of contacting said aqueous acidic solution with an immiscible solution containing di(2-ethyl hexyl) phosphoric acid, separating the organic and aqueous phases thus formed, said aqueous phase containing strontium present in said aqueous acidic solution, and washing the organic phase with an aqueous solution of a mineral acid.

2. A process as claimed in claim 1, wherein the said organic solution is a solution of di(2-ethyl hexyl) phosphoric acid in a hydrocarbon solvent selected from the group consisting of saturated aliphatic hydrocarbons and aromatic hydrocarbons.

3. A process as claimed in claim 2, wherein the said hydrocarbon is hexane.

4. A process as claimed in claim 3, wherein the organic solution is 0.5-2.0 M with respect to di(2-ethyl hexyl) phosphoric acid.

5. A process as claimed in claim 1, wherein said aqueous acidic solution of fission products is 1-3 N in nitric acid and contains 0.5-2.0% of hydrogen peroxide, and wherein contact with said immiscible organic solution containing di(2-ethyl hexyl) phosphoric acid extracts zirconium into the organic phase.

6. A process as claimed in claim 5, wherein the zirconium is extracted from the organic phase by diluting the said organic phase with toluene and contacting such diluted organic phase with aqueous 3-5 N hydrofluoric acid.

7. A process for the treatment of an aqueous acidic solution of fission products which is 0.005-0.1 N in hydrochloric acid, comprising the steps of contacting such solution with an immiscible organic solution containing di(2-ethyl hexyl) phosphoric acid, separating the organic and aqueous phases thus formed, said aqueous phase containing ruthenium, caesium, barium, strontium and rubidium present in said aqueous acidic solution, and washing the organic phase with an aqueous solution of a mineral acid.

8. A process as claimed in claim 7, wherein the organic phase after separation from the aqueous phase is washed with an aqueous 7-11 N nitric acid solution containing 0.1-1.0 M sodium bromate to extract the rare earth metals excluding cerium from the organic phase.

9. A process as claimed in claim 8, wherein the organic phase, after separation from the nitric acid solution, is subsequently contacted with an aqueous 4-10 N hydrochloric acid solution containing 1-10% of hydrogen peroxide to extract cerium from the organic phase.

10. A process as claimed in claim 7, wherein the organic phase, after separation from the aqueous fission product solution, is washed with an aqueous solution containing one of the acids selected from the group consisting of hydrochloric acid and nitric acid to extract the rare earth metals plus cerium from the organic phase.

11. A process as claimed in claim 10, wherein the organic phase, after separation from the acidic washing solution, is subsequently contacted with an aqueous solution of hydrogen peroxide to extract protactinium.

12. A process as claimed in claim 7, wherein the organic phase after separation from the aqueous fission product solution, is washed in turn with aqueous solutions of dilute and concentrated hydrochloric acid to effect separation of the rare earth metals into two sub groups.

13. A process as claimed in claim 12, wherein the dilute hydrochloric acid is 0.3-1.0 normal.

14. A process as claimed in claim 7, wherein the aqueous phase, after separation from the organic phase, is treated to make it alkaline and contacted with an organic solution of 0.005-0.5 M dipicrylamine in nitrobenzene to extract caesium.

15. A process as claimed in claim 14, wherein the said organic solution of dipicrylamine, after separation from the aqueous alkaline phase, is contacted with an aqueous solution of 0.1-5 N hydrochloric acid to extract caesium into such aqueous solution.

16. A process as claimed in claim 14, wherein the aqueous alkaline phase, after separation from the nitrobenzene solution, is treated to make it slightly acidic and contacted with an organic solution 0.2-1.0 M di(2-ethyl hexyl) phosphoric acid in hexane to extract strontium and barium.

17. A process as claimed in claim 16, wherein the hexane solution, after separation from the slightly acidic aqueous solution, is contacted with an aqueous solution of 0.05-2.5 N hydrochloric acid to extract strontium and barium into such aqueous solution.

References Cited

UNITED STATES PATENTS 2,859,094  11/1958  Schmitt et al. _____ 23—14.5

OTHER REFERENCES

Fission Product Recovery, AECD–ORNL–3314, Chem. Tech. Div., annual progress report for period ending June 30, 1962, pp. 116–125.

CARL D. QUARFORTH, *Primary Examiner.*

BENJAMIN R. PADGETT, *Examiner.*

S. TRAUB, *Assistant Examiner.*